Aug. 5, 1952 J. J. SCOTT, JR 2,605,743
POULTRY FEEDING MACHINE
Filed Nov. 26, 1947 3 Sheets-Sheet 1

Inventor
James J. Scott, Jr,

By Mason, Fenwick & Lawrence
Attorneys

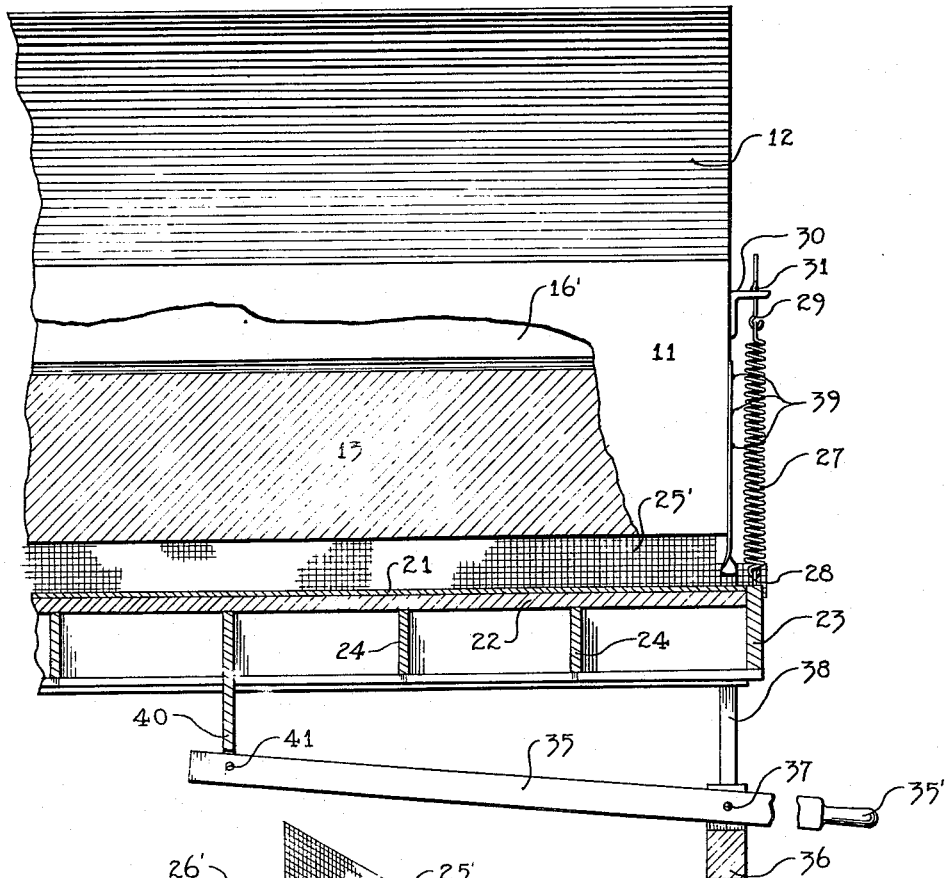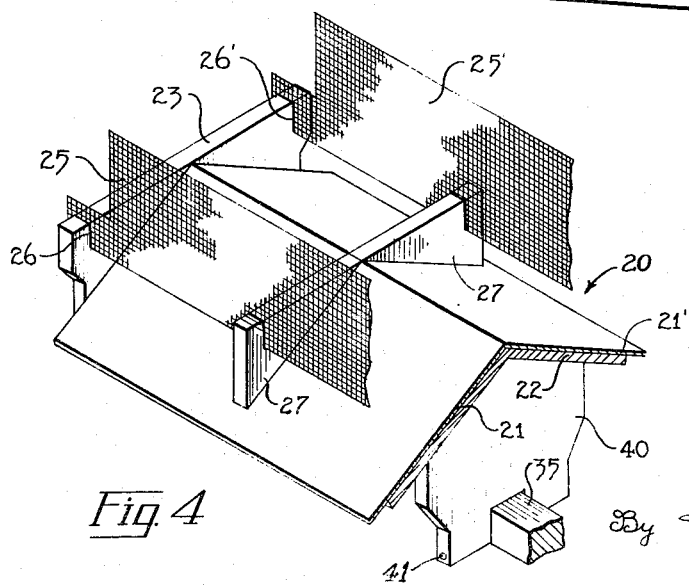

Patented Aug. 5, 1952

2,605,743

UNITED STATES PATENT OFFICE 2,605,743

POULTRY FEEDING MACHINE

James J. Scott, Jr., Bedford, Va.; Nancy H. Scott, administratrix of said James J. Scott, Jr., deceased, assignor of one-half to Oliver and Padgett, Bedford, Va., a partnership Application November 26, 1947, Serial No. 788,111

5 Claims. (Cl. 119—52)

This invention relates in general to poultry feeding devices, and more particularly to devices for retaining large amounts of poultry feed and discharging selected amounts of the feed into troughs on manual operation of the device.

Heretofore, the operation of supplying poultry feed or mash to the poultry feeding troughs in a poultry house has been performed either manually by transporting the feed from the containers in which the feed is stored, usually at a point remote from the poultry house, to the feeding troughs, or by means of remote or automatic control conveyor mechanism. The former or manual performance of this operation, however, absorbs a great amount of time, requiring many trips between the feed storage containers and the feeding troughs to supply enough feed in the troughs where a large poultry raising enterprise is involved, or is limited to performance by relatively strong persons when performed with a large conveyor receptacle to reduce the number of trips and the time required to perform the operation. On the other hand, available automatic conveyor mechanisms involve large initial expense outlay and are of a very complicated structural nature, rendering them difficult to install, maintain and operate. It is desirable to have some means for retaining large quantities of the feed adjacent or in the proximity of the feeding troughs, which could be manually supplied with a sufficient quantity of the feed to last for several months at a time, which renders the reserve quantities of feed retained therein inaccessible to the poultry, and which could be operated in a simple manner by anyone, even children, to discharge a selected quantity of the feed directly into the feeding troughs when required, in order to minimize the time consumed in daily filling the troughs and to permit the operation to be performed by any member of the family.

Accordingly, an object of the present invention is the provision of a novel poultry feeding device for retaining several months' supply of feed adjacent feeding troughs, which is capable of being manually operated to discharge selected quantities of the feed into the troughs.

Another object of the present invention is the provision of a novel poultry feeding device capable on manual operation of distributing selected quantities of poultry feed from a large reserve supply, directly into feeding troughs, which is of simple and economical construction from readily available materials, is adaptable to any type of large poultry enclosure, is extremely durable, and which can be operated by anyone.

Another object of the present invention is the provision of a novel poultry feeding device for retaining a large reserve supply of poultry feed which is capable of discharging a metered quantity of the feed directly into the poultry troughs in a poultry enclosure on manual operation, which has a minimum of moving parts, and which is adapted to be disposed within any normal poultry enclosure.

Other objects, advantages and capabilities of the invention will become apparent from the following description, taken in conjunction with the accompanying drawings, showing only a preferred embodiment of the invention.

In the drawings:

Figure 3 is a side elevation of a portion of the poultry feeding device, shown partially in section and partially in elevation to illustrate the agitator assembly in operative position in the device; and Figure 4 is an enlarged detail isometric view of the movable agitator assembly of the present invention.

Figure 1:
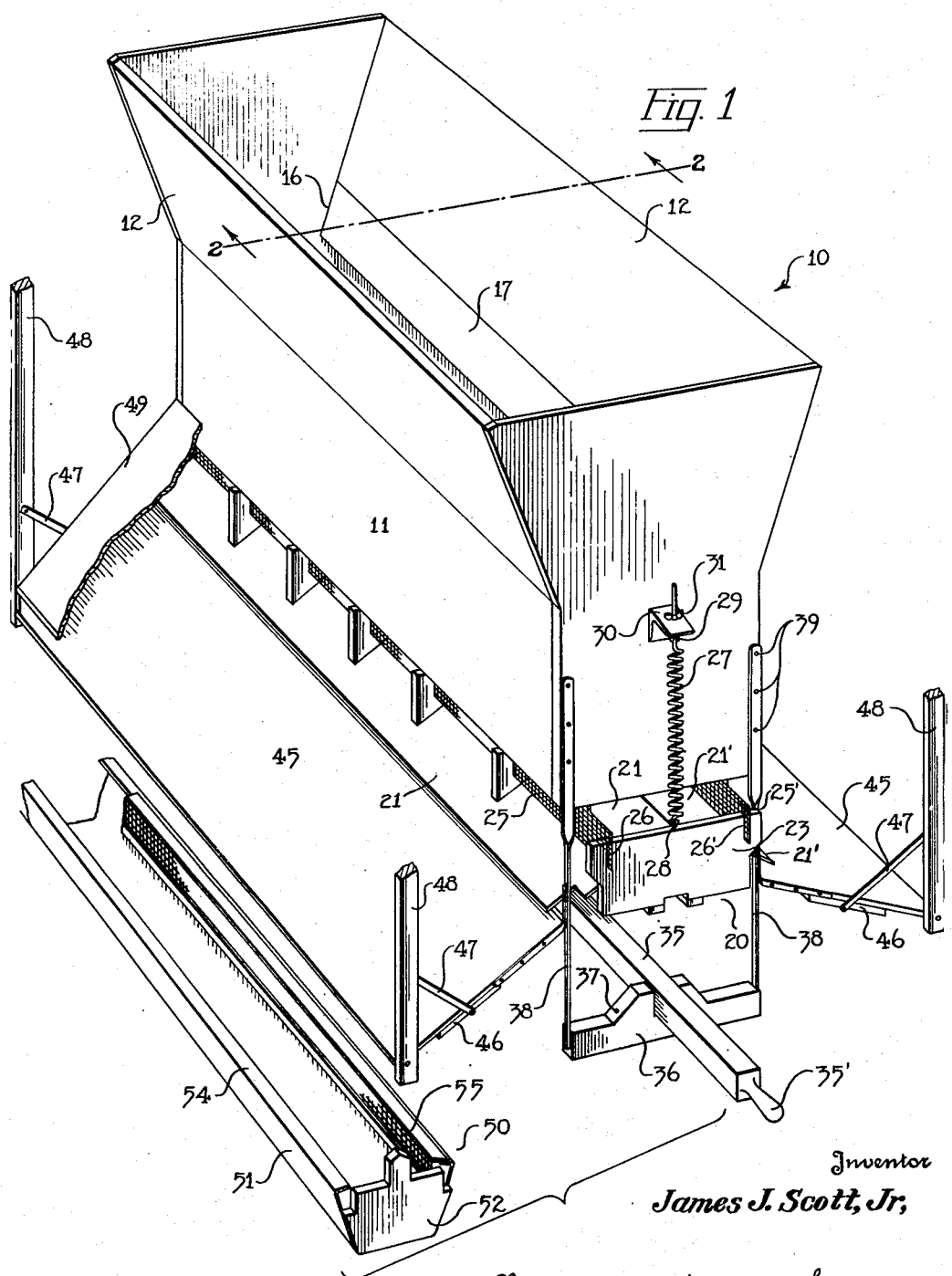
Figure 1 is a perspective view of a poultry feeding device embodying the present invention.
Figure 2:
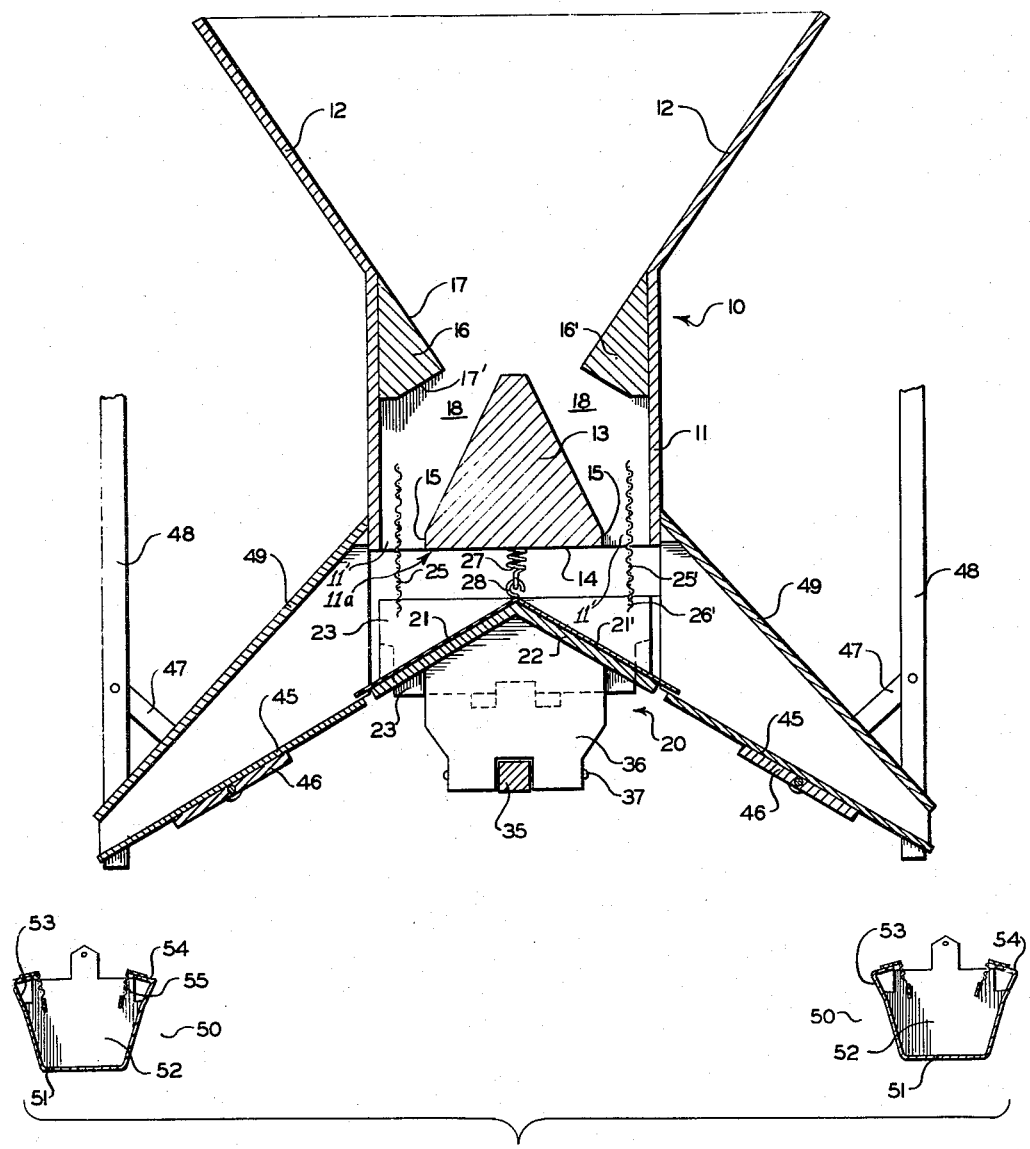
Figure 2 is a vertical transverse section view of the poultry feeding device, taken on the lines 2—2 of Figure 1.

Referring to the drawings, in which like reference characters designate corresponding parts throughout the several figures, and in particular to Figures 1 and 2, an upwardly opening receptacle of rectangular cross section is provided, generally indicated at 10, formed with vertical sides 11 along the lower half thereof, a bottom 11a and upwardly diverging sides 12 at the upper part thereof, constructed to form a hopper for receiving and retaining a large quantity of poultry feed or mash to be introduced to the hopper 10 through the open upper portion 12 thereof. A divider member 13 of triangular cross section, is mounted longitudinally within the receptacle 10 with its base 14 disposed in the plane of the lower ends of the sides 11 to form two parallel discharge slots 11' longitudinally of the receptacle adjacent the lower end of each side 11, the triangular divider member 13 being provided with a flat portion 15 along each side thereof adjacent the base of the divider member 13. Likewise, a pair of deflector blocks 16 and 16' are disposed longitudinally along the sides of the receptacle 10 within the receptacle 10 and above the upwardly disposed apex of the divider member 13, the deflector blocks 16 and 16' being constructed of substantially triangular cross section, with the upwardly disposed face 17 of each block extending downward to a point near the apex of the triangular divider block 13, and the downwardly disposed face 17' forming an inclined diverging channel 18 opening downwardly and laterally with the divider block 13. The inner surfaces of the hopper member 10, and the exposed surfaces of the divider 13 and deflectors 16, 16', are all covered with sheet metal to reduce friction between the feed and the inner surfaces of the hopper.

Movably mounted beneath the lower end of the receptacle 10 below the slots formed between the sides 11 of the receptacle 10 and the divider member 13, is a feed dislodging assembly, generally indicated at 20 and illustrated more clearly in Figures 3 and 4, adapted to discharge poultry feed within the receptacle 10 through the discharge slots 11' at the lower end thereof at a selected feeding rate and directed toward the feeding troughs into which the feed is to be distributed. This assembly 20 comprises a pair of inclined surfaces 21, 21' formed of sheet metal mounted on a reinforcing and slope-defining backing 22, the surfaces 21, 21' extending longitudinally of the receptacle 10 and dislodging assembly 20 and joined along the longitudinal center of the assembly 20 to form downwardly and laterally sloping inclines from a central upwardly pointing apex or ridge aligned vertically with the apex of the divider member 13. The inclined surfaces 21, 21' are mounted between end blocks 23, and are reinforced and shaped by means of shaping blocks 24 disposed below the surfaces and spaced longitudinally thereof. Dislodging blades 25, 25', constructed of wire mesh screen, are disposed in parallel vertical planes extending longitudinally of the assembly 20 and secured in mounting slots 26, 26' provided in the end blocks 23 and like slots provided in triangular mounting blocks 27 positioned at spaced intervals longitudinally of the assembly 20 on the upper surface of the inclined surfaces 21, 21', the blades 25, 25' being spaced laterally of the apex of the inclined surfaces 21, 21' to extend upward into the discharge slots 11' formed at the bottom 11a of the receptacle 10 formed by the sides 11 and the sides 15 of the base 14 of the divider member 13.

The dislodging assembly 20 is mounted for vertical movement relative to the receptacle 10 by means of a pair of coil springs 27 secured to each of the end blocks 23 by means of a hook member 28 and extending vertically along the ends of the receptacle 10 and secured at the upper end of the coil spring 27 to a threaded downwardly-depending hook 29 disposed through an aperture in the horizontal arm of an angle iron bracket 30 secured to each end of the receptacle 10, the threaded portion of the hook member 29 being threaded onto a wing nut 31 disposed above and resting on the bracket 30 to permit the tension of the coil spring 27 to be manually adjusted to define the lower position of the dislodging assembly 20.

To effect movement of the dislodging assembly 20 in a vertical plane with the application of a very small amount of manual force thereto, a lever member 35 is disposed beneath the assembly 20 extending longitudinally thereof with a handle 35' extending beyond the end of the receptacle 10 and end blocks 23, the lever 35 being pivotally mounted to a fixed pivot block 36 by means of a pivot pin 37 extending through the lever 35. The pivot block 36 is secured to the receptacle 10 and rigidly positioned beneath one end of the receptacle 10 by means of strap iron coupling strips 38 secured to the end of the receptacle 10, as by means of mounting screws 39. The inner end of the lever 35 underlies the longitudinal center of the dislodging assembly 20, and is pivotally coupled thereto by means of a central coupling block 40 secured to the assembly 20 and pivotally coupled to the inner end of the lever 35 by means of coupling pin 41. With the coil springs 27 adjusted to substantially the same tension so as to normally dispose the dislodging assembly 20 horizontally, the application of a small amount of force to the lever handle 35' to move the end of the lever 35 in an oscillatory manner in a vertical plane will oscillate the dislodging assembly 20 and the vertical dislodging blades 25, 25' in a vertical plane through the discharge slots 11' defined in the lower end of the receptacle 10, the assembly 20 being maintained always disposed horizontally by the coil springs 27 by which it is suspended from the receptacle 10 and by the application of the moving force thereto through the central coupling block 40 to which the inner end of the lever 35 is coupled.

Underlying the outer edges of the inclined surfaces 21, 21' of the dislodging assembly 20, are the upper edges of a pair of inclined guide surfaces 45, constructed of sheet metal supported on slope-defining supports 46 positioned by means of strap iron strips 47 or similar means, coupled to vertical supporting members 48 mounted to ceiling rafters of the poultry house, or other convenient structural elements, for fixedly mounting the inclined guide surfaces 45 independent of the receptacle 10, the inclined guide surfaces 45 extending downwardly and laterally of the dislodging assembly 20 to guide poultry feed or mash discharged from the receptacle or hopper 10 by operation of the dislodging assembly 20 into feeding troughs, indicated generally at 50, disposed conveniently in mutually parallel axes laterally spaced from and below the hopper 10. A hood member 49 is preferably provided as a cover for the inclined guide surfaces 45 spaced above the lower edge of the guide surfaces 45 at the lower end of the hood member 49 to provide an elongated opening through which the feed can drop from the guide surfaces 45 into the troughs 50, the hood member 49 being shaped to extend upwardly to the lower edge of the sides 11 of the receptacle 10 to protect the dislodging assembly 20 and the inclined guide surfaces 45. This hood member 49 is removably disposed over the guide surfaces 45 to permit access to the guide surfaces 45 and dislodging assembly 20 for cleaning and repair, when required.

The feeding troughs 50 may be of any convenient form or design, and form no part of the present invention. The feeding troughs illustrated are formed of sheet metal 51, bent in the shape of a longitudinal upwardly opening trough, secured to and closed at each end by forms 52, the upper edges of the sides of the troughs 50 being bent outwardly as at 53, at a greater angle than the lower portion of the sides 52, and then bent inward to form flanges 54, to each of which a strip of wire mesh screen 55 is secured and disposed in a downwardly inclined plane converging with the plane of its associated side of the trough 50 to catch the poultry feed kicked up from the center of the trough during feeding, and permit the feed thus thrown toward the sides of the trough to slide down the sides 53 of the trough toward the center thereof, the strip of wire mesh screen 55 preventing the poultry from feeding near the upper edges of the sides of the trough, and thus kicking or throwing the feed entirely out of the trough.

Operation of the instant device is as follows: The device is located in a convenient place within the poultry house such that the feeding troughs associated therewith may be disposed in readily accessible locations for the poultry, preferably suspending the feeding device from ceiling rafters in the center of the poultry house. The hopper member formed by the divergent sides 12 and vertical sides 11 of the receptacle 10 may be substantially filled from the top with the poultry feed or mash to be periodically distributed to the poultry, the size of the hopper member being designed according to the number of such poultry to be fed to hold sufficient feed to supply the poultry for several months. With the dislodging assembly 30 disposed in its upwardly urged position by the coil springs 27 by which it is supended, with the dislodging blades 25, 25' disposed between the parallel discharge slots 11' in the bottom 11a of the receptacle 10 formed by the sides 11 of the receptacle and the divider member 13, the bulk of the poultry feed poured into the top of the hopper will be deflected by means of the deflector blocks 16, 16' and the triangular divider member 13 in generally downwardly and outwardly inclined directions into the channels 18 defined between the downwardly disposed faces 17' of the deflector blocks 16, 16' and the sides of the divider member 13 leading to the discharge slots at the bottom of the receptacle 10. Because of the close proximity of the lower edges of the sides 11 of the hopper and the lateral portions 15 adjacent the base of the divider block 13, forming the slots 11' of narrow width along the bottom of the receptacle 10, and the further restrictive effect of the wire mesh dislodging blades 25, 25' lying within the slots, an interparticle bond of the mash is formed immediately above and along the length of the discharge slots 11', blocking the slots to passage of poultry feed mash therethrough. This strong tendency of the poultry feed mash to bond or become tied together through attraction of the particles making up the mash, is a characteristic of the particular content of the mash, probably due to the high oil content of the mash, and occurs whenever the restrictions imposed on the flow or passage of the mash are great enough to overcome gravitational forces urging passage of the mash.

In practice the slots 11' formed adjacent to the sides 11 of the receptacle should not be greater than ½" in width, this being effectively reduced to less than ¼" by the vertical feed dislodging blades 25, 25' disposed therein. Positive bonding or tying of the machine across the discharge slot 11' is insured by the particular formation of the divider block 13 adjacent the base edges 15 disposed immediately alongside the wire mesh blades 25, 25'. The lower edges of the inclined lateral surfaces of the divider block 13 in the area adjacent the edges 15 and blades 25, 25' serve as a barrier-like formation or restrictive surface to retard passage of mash thereby and deflect the direction of the force upon it due to the weight of the mash laterally toward the blades 25, 25' and the sides 11 of the hopper.

To distribute feed from the supply retained in the hopper member formed by the receptacle 10 into the feed troughs 50 associated therewith, it is only necessary to manually force the exposed end of the lever 35 downward and upward several times about the pivot pin 37 in the pivot block 36 coupled to the receptacle 10, this force being applied at the center of the dislodging assembly 20 through the coupling pin 41 in the central coupling block 40 to lower and elevate the assembly 20 and the dislodging blades 25, 25' coupled thereto, and disposed within the discharge slots at the bottom of the receptacle 10, and discharge a uniformly distributed and controlled quantity of the poultry feed or mash through the discharge slots onto the inclined surfaces 21, 21', of the dislodging assembly 20 and the inclined guide surfaces 45 associated therewith, to guide the discharged feed into the feeding troughs 50 aligned beneath the lower ends of the guide surfaces 45. When movement of the dislodging assembly 20 is stopped, the poultry feed within the receptacle 10 again packs up against the dislodging blades 25, 25' within the discharge slots to stop further discharge. To facilitate the packing and discharge of the feed within the receptacle 10, all exposed surfaces with the receptacle 10 are lined with sheet metal.

It will be apparent from the above description that a novel poultry feeding device has been provided, in which several months' supply of feed can be disposed at one filling, and which can be conveniently and simply controlled by application of a small amount of manual force thereto to discharge a controlled amount of the feed retained therein simultaneously into a plurality of feeding troughs, thereby reducing the amount of manual labor involved in the feeding operation and the time required to perform it.

While only one particular embodiment of the invention has been particularly shown and described, it is distinctly to be understood that the invention is not limited thereto, but that various modifications may be made in the invention without departing from the spirit and scope thereof, and it is desired, therefore, that only such limitations shall be placed thereon as are imposed by the prior art and are set forth in the appended claims.

Having thus fully described my invention, I claim:

1. A poultry feeding device for retaining a large quantity of poultry feed and selectively discharging controlled quantities of the feed into feeding troughs comprising, hopper means having a plurality of elongated parallel discharge slots, a plurality of wire mesh blade means mounted for vertical movement and extending into said slots continuously along the length thereof, means iwthin said hopper means defining inclined channels communicating with and converging toward said slots to direct feed wedgingly toward said slots and against said blade means to effect bonding of the feed across said slots and close said slots against discharge therefrom, and means coupled to said blade means for manually moving said blade means in vertical planes within said slots to disturb the bonding of the feed and discharge said feed through said slots during such movement.

2. A poultry feeding device for retaining a large quantity of poultry feed and selectively discharging controlled quantities of the feed into feeding troughs comprising, hopper means having a plurality of elongated parallel discharge slots, a plurality of mutually parallel vertical wire mesh blade means mounted for vertical movement and extending into said slots continuously along the length thereof, means defining diverging inclined channels communicating from a central location within said hopper means with and converging toward said slots to direct feed wedgingly toward said slots and against said wire mesh blade means to effect bonding of the feed across said slots and close said slots against discharge therethrough, and means coupled to said blade means for manually oscillating said blade means in vertical planes within said slots to disturb said bonded feed and discharge said feed uniformly through said slots during such movement.

3. A poultry feeding device for retaining a large supply of poultry feed and selectively discharging controlled quantities of the feed into poultry feeding troughs comprising, hopper means having side, end and bottom forming means, defining a plurality of discharge slots disposed along the bottom thereof, discharge means resiliently suspended beneath said hopper means urged upwardly adjacent the bottom of said hopper means and having vertical wire mesh blades extending into said discharge slots continuously along the length thereof, means within said hopper means defining inclined channels communicating with said slots and converging toward said slots to direct feed wedgingly toward the slots and against said wire mesh blades to effect inner-particle bonding of the feed across said slots and close said slots against discharge, means coupled to said discharge means for manually moving said discharge means and said blades in a vertical plane to disturb said bonding and discharge said feed through said slots during movement, and guide means positioned relative to said slots to direct the discharged feed into troughs.

4. A poultry feeding device for retaining a large supply of poultry feed and selectively discharging controlled quantities of the feed into feeding troughs comprising, hopper means having side, end and bottom forming means, defining discharge slots in the bottom of said hopper disposed longitudinally adjacent the sides thereof, discharge means mounted beneath said hopper means having wire mesh blades thereon disposed in parallel vertical planes and extending into said slots continuously along the length thereof, divider means disposed longitudinally within said hopper means having inclined sides sloping from a central location within said hopper means to said slots, and deflector means disposed above said blades forming with said divider means inclined channels diverging toward said slots to direct feed wedgingly toward said slots and against said blades to relieve the area immediately above said blades from the weight of the feed in said hopper to effect inner-particle bonding of the feed across said slots and close said slots against discharge, means coupled to said discharge means for manually moving said discharge means and said blades in a vertical plane to disturb said bonding and discharge said feed through said slots during such movement, and guide means positioned relative to said slots to direct the discharged feed into troughs.

5. A poultry feeding device for retaining a large supply of poultry feed and selectively discharging controlled quantities of the feed into feeding troughs comprising, hopper means having side, end and bottom forming means, defining a pair of discharge slots formed in the bottom thereof disposed adjacent the sides thereof, discharge means resiliently suspended at each end beneath said hopper means urged upwardly adjacent the bottom of said hopper means and having wire mesh blades thereon disposed in parallel vertical planes and extending a substantial distance into said slots continuously along the length thereof, means within said hopper means defining inclined channels communicating with and converging toward said slots to direct feed wedgingly toward said slots and against said blades to effect inner-particle bonding of the feed across said slots and close said slots against discharge, lever means coupled to said discharge means centrally thereof for manually oscillating said discharge means in a vertical plane while maintaining said discharge means on a horizontal axis to disturb the bonded feed within said slots and discharge said feed during such movement, and guide means positioned relative to said slots to direct the discharged feed into troughs.

JAMES J. SCOTT, Jr.

REFERENCES CITED

The following references are of record in the file of this patent:

UNITED STATES PATENTS

| Number | Name | Date |
|---|---|---|
| 734,631 | Stubbs | July 28, 1903 |
| 1,036,882 | Moore | Aug. 27, 1912 |

FOREIGN PATENTS

| Number | Country | Date |
|---|---|---|
| 111,442 | Australia | Sept. 12, 1940 |